(12) United States Patent
Goldstein et al.

(10) Patent No.: US 9,201,450 B2
(45) Date of Patent: Dec. 1, 2015

(54) MODULE AND PORT

(75) Inventors: Martin Goldstein, Campbell, CA (US);
Arlen L. Roesner, Ft. Collins, CO (US);
Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 13/702,117

(22) PCT Filed: Jun. 7, 2010

(86) PCT No.: PCT/US2010/037648
§ 371 (c)(1),
(2), (4) Date: Dec. 5, 2012

(87) PCT Pub. No.: WO2011/155923
PCT Pub. Date: Dec. 15, 2011

(65) Prior Publication Data
US 2013/0077220 A1    Mar. 28, 2013

(51) Int. Cl.
*H05K 5/00* (2006.01)
*G06F 1/16* (2006.01)
(Continued)

(52) U.S. Cl.
CPC ...... *G06F 1/16* (2013.01); *G06F 1/181* (2013.01); *G06F 1/183* (2013.01); *G06F 1/187* (2013.01);
(Continued)

(58) Field of Classification Search
CPC ............ G06F 2207/3868; G06F 5/065; G06F 11/2005; G06F 12/00; G06F 13/36; G06F 13/385; G06F 1/1626; G06F 1/1632; G06F 1/1656; G06F 1/66; G06F 1/1669; G06F 1/1671; G06F 1/169; G06F 2200/1614; G06F 2200/1634; G06F 3/03545; G06F 3/041; G06F 3/04886; G06F 1/16; G06F 1/181; G06F 1/183; G06F 1/187; G06F 2200/1635; G06F 1/1622; G06F 1/1679; G11B 33/122; Y10T 29/49117; H01R 13/6205; H01R 13/6315; H01R 13/74; H01R 2201/706; H01R 43/12; H01R 11/30; H01R 12/79; H01R 12/91; H01R 13/2407; H01R 43/20; H05K 1/189; H05K 3/4691; H05K 5/0021; H05K 5/0221
USPC .......... 361/679.02, 679.33–679.39, 133, 139, 361/776, 679.4, 679.45, 679.01; 29/825
See application file for complete search history.

(56) References Cited

U.S. PATENT DOCUMENTS 6,145,539 A * 11/2000 Wilcox et al. ............ 137/614.03
6,356,952 B1    3/2002 Nagasawa
(Continued)

FOREIGN PATENT DOCUMENTS

| CN | 1163413 | 10/1997 |
|---|---|---|
| CN | 101681186 | 3/2010 |
| EP | 0790672 | 8/1997 |

OTHER PUBLICATIONS

International Search Report and Written Opinion received in PCT Application No. PCT/US2010/037648, mailed on Feb. 22, 2011, 9 pages.

*Primary Examiner* — Anthony Haughton
*Assistant Examiner* — Ingrid Wright
(74) *Attorney, Agent, or Firm* — Hewlett-Packard Patent Department

(57) ABSTRACT

A first module including a first port to connect to a second module including a second port. The first port including an attraction field to attract a second port if the second port was within the attraction field. A flexible member can be connected to the first port and a first edge can apply a force to the first port.

18 Claims, 6 Drawing Sheets

(51) Int. Cl.
*G06F 1/18* (2006.01)
*G11B 33/12* (2006.01)
*H01R 13/62* (2006.01)
*H01R 13/631* (2006.01)
*H01R 43/20* (2006.01)
*H01R 13/74* (2006.01)

(52) U.S. Cl.
CPC .......... *G11B 33/122* (2013.01); *H01R 13/6205* (2013.01); *H01R 13/6315* (2013.01); *H01R 43/20* (2013.01); *G06F 2200/1635* (2013.01); *H01R 13/74* (2013.01); *H01R 2201/06* (2013.01); *Y10T 29/49117* (2015.01)

(56) References Cited

U.S. PATENT DOCUMENTS

| | | | |
|---|---|---|---|
| 7,042,737 B1 * | 5/2006 | Woolsey et al. | 361/799 |
| 7,239,509 B1 | 7/2007 | Roeske | |
| 7,505,261 B2 * | 3/2009 | Reasoner et al. | 361/679.33 |
| 8,098,492 B2 * | 1/2012 | Rosenberg et al. | 361/736 |
| 2003/0035268 A1 | 2/2003 | Coglitore et al. | |
| 2003/0161114 A1 | 8/2003 | Berry et al. | |
| 2011/0206328 A1 * | 8/2011 | Wang | 385/94 |

* cited by examiner

MODULE AND PORT

BACKGROUND

A computing system may be a modular system. The system may include a processing module and a storage module for example. The modules can be installed in a chassis that the modules connect to. The chassis provides a communications channel between the modules and can also provide the modules with power. The communications between the modules is an electrical connection that carries electrical signals between the modules. The electrical connection can be a communications bus. The components may be able to process information faster than the communications bus can carry the information creating a bottle neck between the modules as they are waiting to send or receive information on the communications bus.

BRIEF DESCRIPTION OF THE DRAWINGS

Some embodiments of the invention are described with respect to the following figures.

DETAILED DESCRIPTION

To reduce the communications bottle neck between the modules of a system the module can communicate directly with each other and not through the chassis that they are installed in. Modules communicating directly with each other may be able to reduce the bottle neck created by the chassis which may transmit information for more than the two modules that are trying to communicate on the communications bus.

Optical communications can transmit data at the speed of light and may include multiple channels of data in the form of modulation of the light. An electrical based communications bus may also include multiple channels of data by for example a modulation of the channels.

The modular computing system wherein the modules can communicate directly with each other and not rely on the chassis for communications between the modules while also implementing an optical communications system can reduce the bottleneck created by a communications system in the chassis connecting the two modules or by an electrical based communications system.

In one embodiment a first module including a first port can connect to a second module including a second port. The first port including an attraction field to attract a second port if the second port was within the attraction field. A flexible member can be connected to the first port and a first edge can apply a force to the first port.

Figure 1:
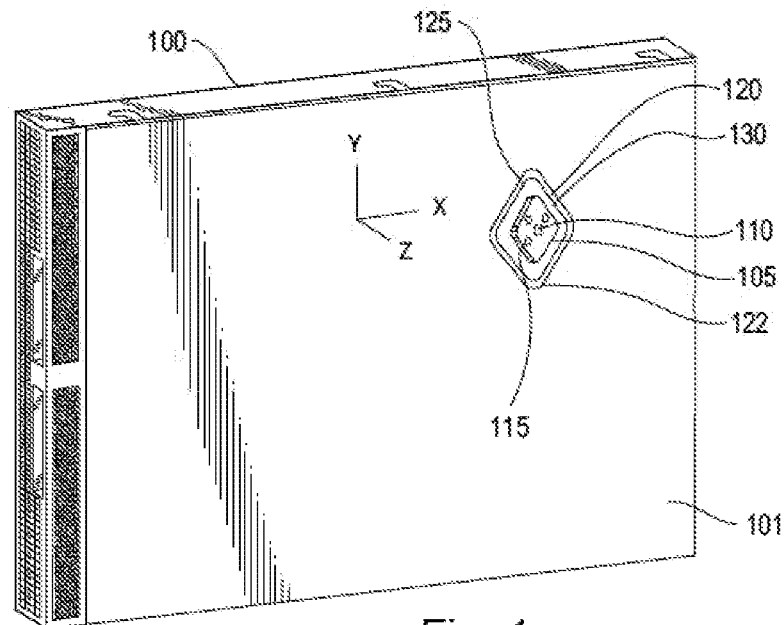
FIG. 1 is a first module according to an example embodiment of the invention.

With reference to the figures, FIG. 1 is a first module according to an example embodiment of the invention. The first module 100 may be a computing system including a first processing device, memory and an input output device for example. The first module 100 may also be a part of a computing system, for example the first module may be the processing module and another module may include the memory, the storage or the input output devices for example.

The first module 100 includes a first housing 101. The first housing 101 includes a first opening 122 in a side of the first housing 101. The first opening 122 may have a ring 120 in the opening. The ring 120 may have an opening that is smaller than the first opening 122 in the first housing 101.

In the opening of the ring 120 can be a first port 105. The first port can be attached to the first module with a flexible member 130. The flexible member 130 can be attached to the ring 120 or the housing 101 for example. The flexible member 130 can be a continuous piece surrounding the first port 105 or may be multiple pieces of flexible members that support the first port 105 so that the first port 106 is in the opening. The flexible member allows the first port 105 to move in the X, Y and Z direction in the opening of the ring 120. The flexible member 130 may be for example a rubber or another resilient material.

The first port 105 can include a first bus 110 to transmit or receive data. To communicate data the first bus 110 can be aligned with a second bus on another module. The first bus 110 can be for example an optical bus to transmit or receive optical signals containing digital data. The first bus can receive data from for example a general input output device, memory, a processing device or another component of the first module 100.

The first port 115 may have first alignment devices 115. The first alignment devices can align the first port 105 and the first bus 110 on the first port with a second port and a second bus on the second port. The alignment devices 115 may be magnetic and attract the second port to the first port 105. The alignment devices 115 may be a hemisphere, cone, pyramid or another shape wherein the cross section of the alignment devices 115 near a surface of the first port 105 is greater than the cross section of the alignment devices 115 as the alignment devices 115 extend away from the surface of the first port 105. The may be more that one alignment device 115 so that if the first port 105 connects to a second port the first port and the second port can be aligned in the X, Y, and Z directions as well as rotationally around the Z axis. The first port may be below the surface of the side of the first housing 101 so that if not connected to a second port that the first port is protected by the first housing 101. If the first port is attracted to a second port the flexible member allows the first port to move in the Z direction and extend from the first housing 101 through the opening 122. The first port 105 may extend for example 5 millimeters from the side of the first housing 101 to make the connection to the second port.

If the first port 105 and a second port are attracted to each other through a field created by a magnet for example the separation of the first port from the second port may occur. The ring 120 can include a first edge 125. The first edge 125 can include be made as one piece with the first ring 120. The ring 120 may be made of a material that is not attracted to the field created to attract the first port 105 to a second port. If the field is a magnetic field then the ring 120 may be made of a plastic, ceramic, aluminum, brass or another material that is not attracted by a magnet.

If the first port 105 is connected to a second port the first edge 125 of the ring may come into contact with the first port as the first port and the second port are separated. The first port 105 is not attracted to the ring 120 and therefore if the first edge 125 of the ring 120 is not attracted by the field then the first port 105 will remain in the position determined by the flexible member 130 rather than that determined by field attracting the first port 105 to the first edge 125.

Figure 2:
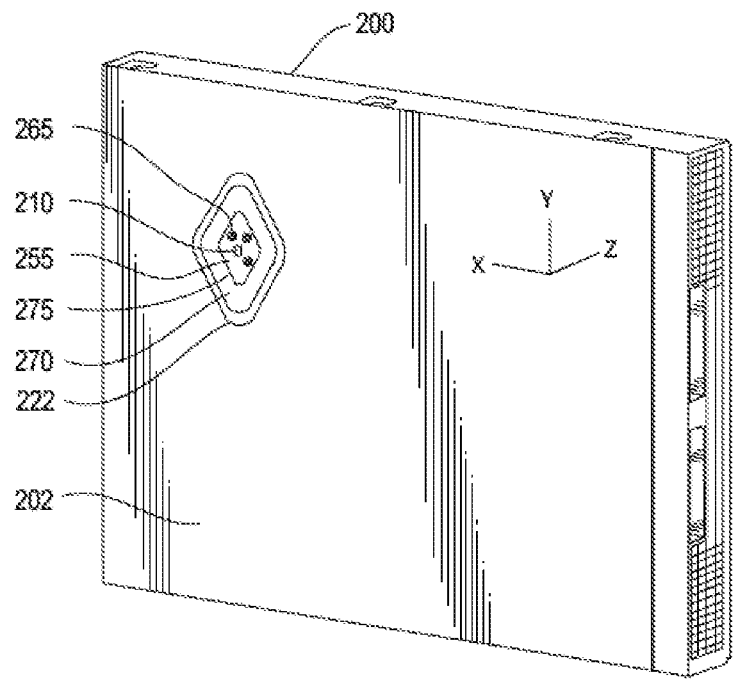
FIG. 2 is a second module according to an example embodiment of the invention.

FIG. 2 is a second module according to an example embodiment of the invention. The second module 200 can include a second port 255. The second port 255 can include a second bus 210. The second port 255 can be attracted to a first port and communicate data from a second bus 210 on the second port 255 to a first bus on a first port. The second port can be aligned so that the first port and the second port as aligned if the first module and the second module 200 are adjacent to one another.

The second module 200 can include a second housing 202. The second housing 202 can include a second opening 222 in a side of the second housing 202. The opening of the second housing 202 may include a second ring 270 attached to the second housing 202 in the opening 222. The second ring 270 may be made of a material that is not attracted by the field created by the first port. For example the second ring may be made of the material that is not attracted by a magnetic field if the first port creates a magnetic field to attract the first port toward the second port. The second ring may help prevent the first port from attaching to the side of the second housing 202 if the first port was attracted to the side of the second housing 202 rather than being attracted to the second port 255.

The second port 255 can include a second alignment device 265. The second alignment device 265 can be a crevice or indention that is capable of accepting a first alignment device on a first port. There may be second multiple alignment devices 265 corresponding to multiple first alignment devices on a first port. The second alignment devices 265 can align the second bus 210 to the first bus on the first port if the first port includes the first alignment devices that correspond to the second alignment devices 265.

In one embodiment between the second ring 270 and the second port 255 there is a gap. The supporting the second port 255 in the opening can be a flexible material. The flexible material can allow the second port 255 to move in the X, Y, and Z directions. If the first port and the second port are both supported by a flexible material then the movement of the first port in the X direction may be reduced by the amount of movement of the second port in the negative X direction. If the second port is supported by the flexible material then the ring may include a second edge that can apply a force to the second port in the opposite direction as the first edge is applying force to the first port 105. For example if the First edge is applying force to the first port in the X direction then the second edge is applying force on the second port in the negative X direction.

If the first module and the second module 200 are separated by a for example 5 millimeters then the first port may extend 5 millimeters in the Z direction from the first module to connect to the second port 255. If the first port and the second port 255 are both supported by a flexible material then the first port may extend approximately half the distance between the first module and the second module 200 and the second port 255 can extend approximately half the distance between the first module and the second module 200 and there for the first port and the second port may meet between the first module and the second module.

Figure 3:
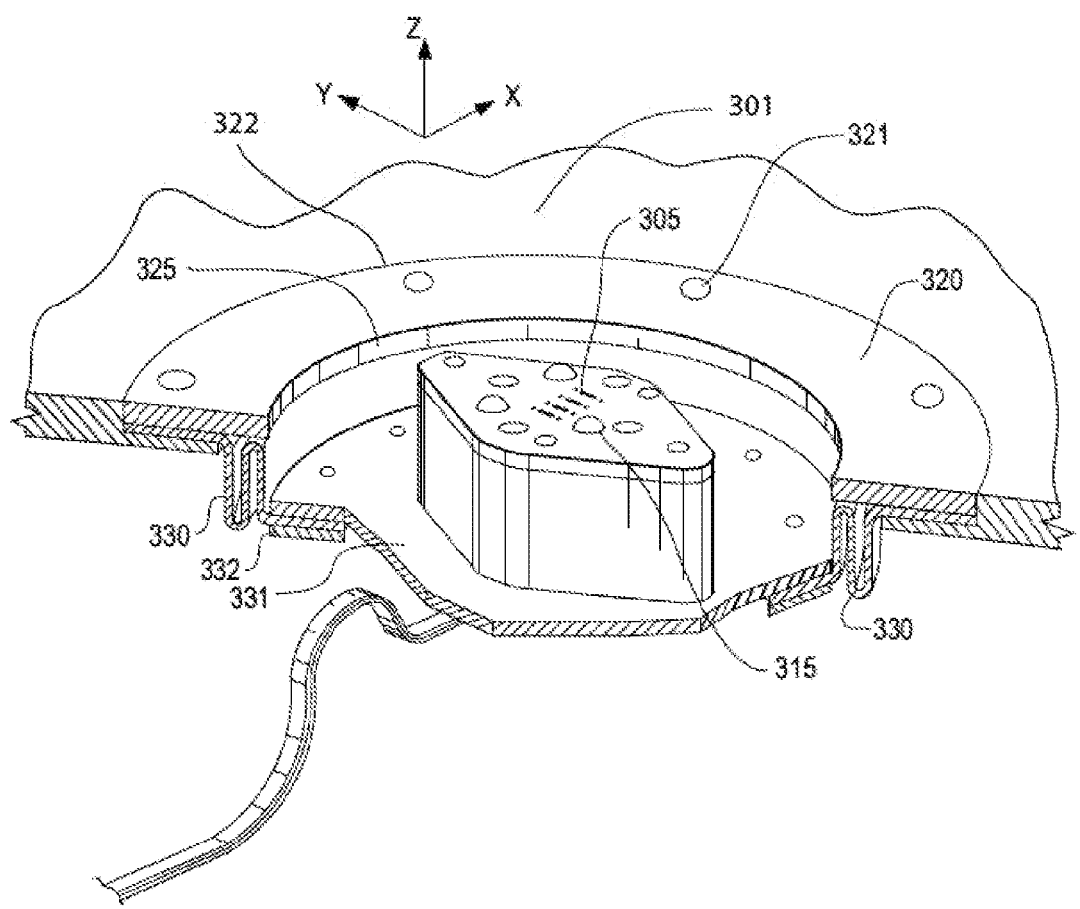
FIG. 3 is a port according to an example embodiment of the invention.

FIG. 3 is a port according to an example embodiment of the invention. The first port 305 includes a first alignment device 315. Although the shape of the first port is a diamond the first port may have any shape including a polygon, a circle, an oval or another shape. The first alignment device can align the first port 105 with a second port. The first port 305 can be surrounding by a first ring 320. The first ring may include a ring opening defined by the first edge 325. The first ring 320 can be within the first opening 322 in the first housing. The first ring 320 can provide a separation between the first port 105 and the first housing 301. The distance between the first edge 325 and the first opening 322 can be determined by the amount of attraction between the first port 305 and the first housing 301. For example if the strength of a magnetic force in the first port 305 is increased the distance between the first port 305 and the first housing 301 have to be increased so the that the first port is not attracted toward the first housing 301 if the first edge contacts the first port 305.

The first port is supported by a flexible member 330. The flexible member 330 is resilient and can return to the previous formation when not under force. If the movement of the first port 305 causes the flexible member 330 to flex the flexible member 330 can return to its previous position when the force applied by the first port to the flexible member 330 is removed. The first port 305 may move in the X, Y or Z direction to align with a second port causing the flexible member to flex in the direction of movement of the first port 305 and return to the previous position if the first port 305 is separated from the second port. The flexible member 330 can be attached to the first housing 301 in different manners. For example, the flexible member 330 may be clamped between the first ring 320 and the first housing 301. The first ring and the first housing may be connected by a fastener 321. The fastener 321 can be for example a rivet, screw or another fastener. The first port 305 can be attached to the base 331. The base 331 may be for example a rigid material relative to the flexible member 330. The rigid material may be for example a plastic, stainless steel, ceramic or another material. A clamp ring 332 may clamp the flexible member 330 to the base 331. The clamp ring 332 may be connected to the claim ring 332 with a fastener for example a rivet, screw or another fastener.

Figure 4:
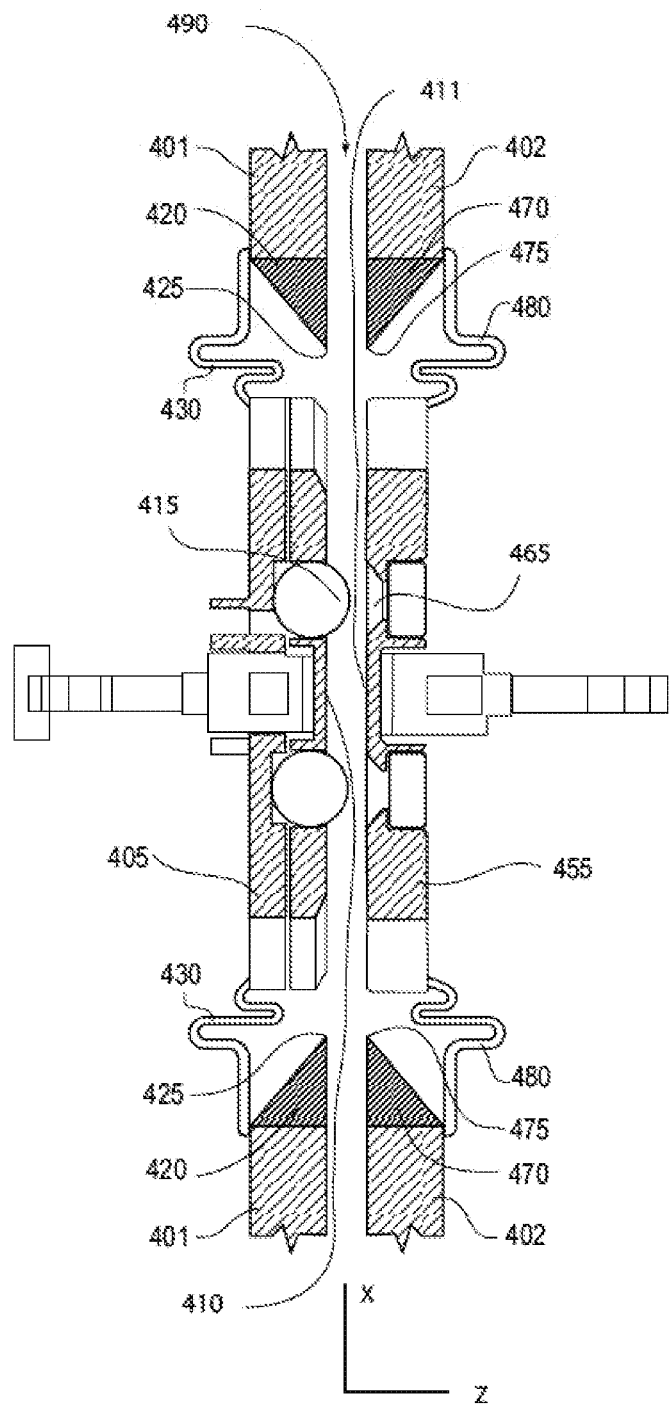
FIG. 4 is a cross-sectional view of a first port and a second port according to an example embodiment of the invention.

FIG. 4 is a cross-sectional view of a first port and a second port according to an example embodiment of the invention. The first port 405 can include a first bus 410 and the second port 455 can include a second bus 411. The first alignment device 415 can be accepted by the second alignment device 465. In one embodiment the first alignment device 415 and the second alignment device 465 are attracted by a field such as a magnetic field. The first port 405 is supported by a first flexible member 430 in the opening defined by the first edge 425. The first port 405 may have a beveled edge to allow the first edge to apply force in the X and Z directions. The second port 455 is supported in the opening by a second flexible member 480 in the opening defined by the second edge 475. The first edge 425 may be a part of the first ring 420 and the second edge 475 may be part of the second ring 470. The first ring 420 may be connected to the first housing 401 and the second ring 470 may be connected to the second housing 402. The first ring 420 and the first housing 401 may be made of different materials. The first ring 420 may be made of a material that is not attracted to the field created by the first port 405 such as a non magnetic material. The first housing may be made of a material that is attracted to a magnetic field.

The first housing 401 may cause the first port 405 or the second port 455 to move in the x direction so that the first bus 410 and the second bus 411 can communicate date between the first bus 410 and the second bus 411. The first port 405 can move in the Z direction and if the second port is supported by the second flexible member 480 rather than be attached to the second ring 470 then the second port 455 can also move in the Z direction. If both the first port 405 and the second port 455 move in the Z direction the first port 405 and the second port 455 may connect to each other in the area 490 between the first housing 401 and the second housing 402.

Figure 5C:
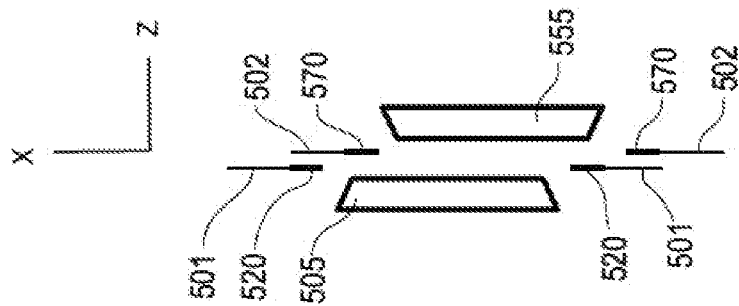
FIGS. 5a, 5b and 5c are a functional depiction according to an example embodiment of a chassis of the invention.
Figure 5B:
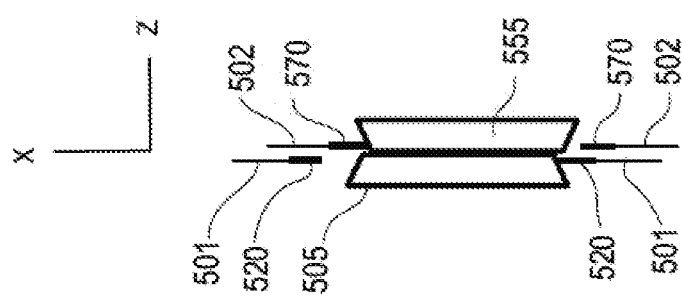
Figure 5A:
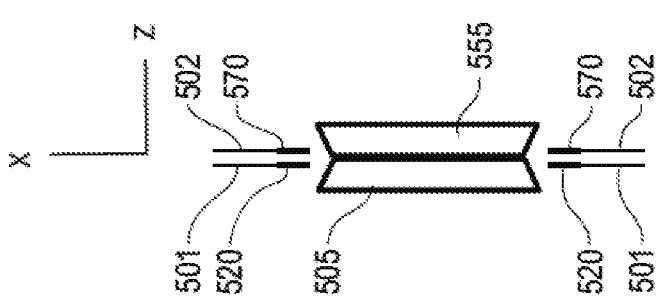

FIGS. 5a, 5b and 5c are a functional depiction according to an example embodiment of a first port and a second port of the invention. The first port 505 can be in contact with the second port 555. The first ring 520 is not in contact with the first port 505 and the second ring 570 is not in contact with a second port 555 if the first port 505 and the second port 555 are in the normal connected position shown in FIG. 5a. The first ring 520 is connected to the first housing 501 and the second ring 570 is connected to the second housing 502.

FIG. 5b depicts an example of the first ring 520 contacting the first port 505 in the X direction and the second ring 570 contacting the second port 555 in the negative X direction. As a first ring 520 and a second ring 570 apply force to the first port 505 and the second port 555 the field attracting the first port 505 and the second port 555 together will be overcome by the force applied by the first ring 520 and the second ring 570.

Once the field attracting the first port 505 to the second port 555 has been overcome by the force applied by the first ring 520 and the second ring of 570 the first port 505 may retract behind the first ring 520 so that second ring 570 does not make contact with the first port 505.

Figure 6:
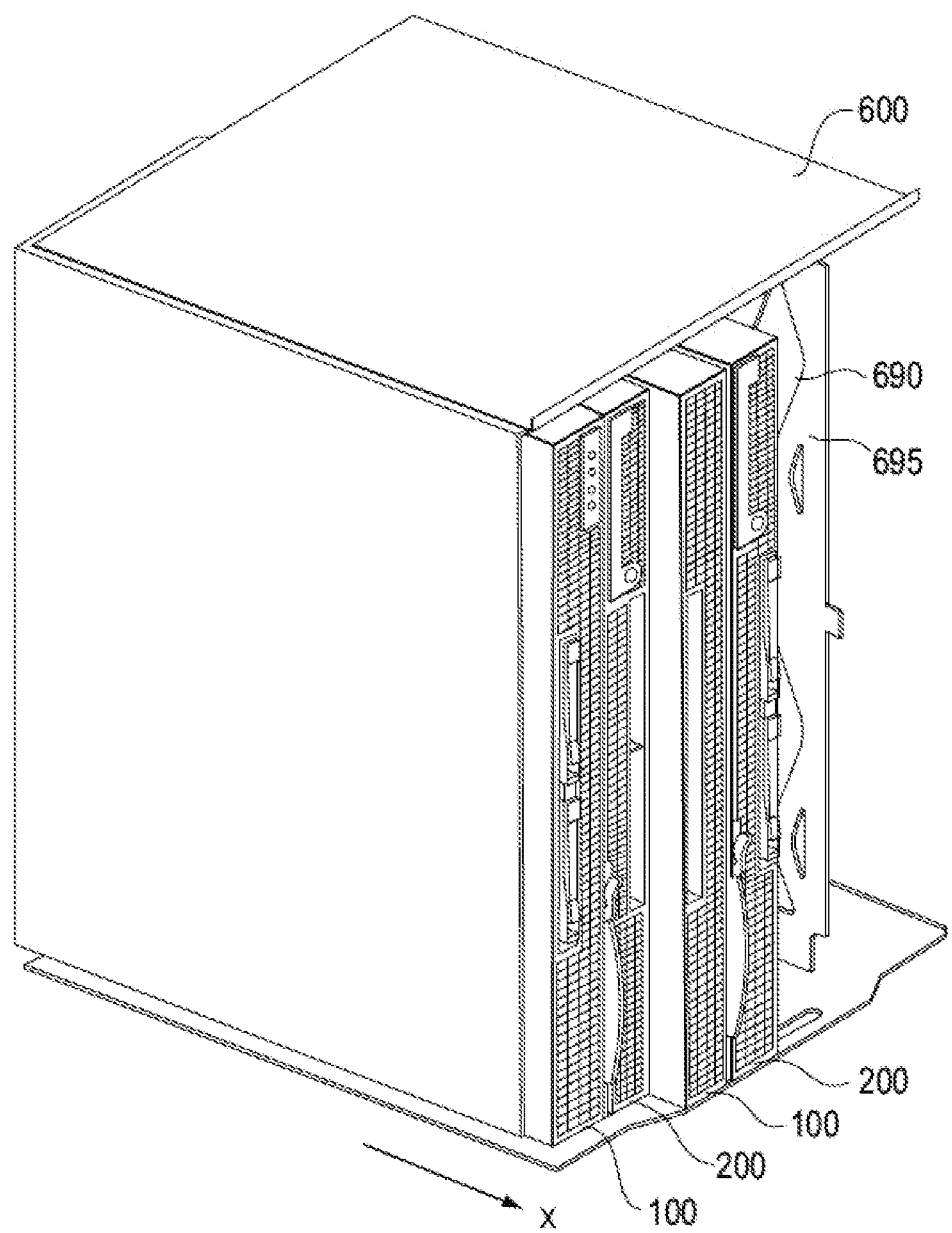
FIG. 6 cross-sectional view of the chassis according to an example embodiment of the invention.

FIG. 6 cross-sectional view of the chassis according to an example embodiment of the invention. The chassis 600 includes dividers 695. The dividers 695 can include openings 690. The dividers 695 can create a volume for a module to be inserted into. For example the first modules 100 and the second modules 200 are inserted into the Chassis 600. The first module 100 is adjacent to the second module 200. If the first module 100 is adjacent to the second module 200 the first port on the first module 100 can align with the second port on the second module 200 to create a data bus between the first module 100 and a second module 200. The connection between the first port and a second port allows the first module 100 to communicate data with the second module 200 without using a data bus that is part of the chassis 600. The chassis 600 may have a data bus that can be used by the first module 100 to communicate with a second module 200. The chassis 600 may also include other components such as a power supply or a power distribution system to supply power to the first module 100 and the second module 200.

In one embodiment the openings 690 in the divider 695 are the same shape as the first port on the first module 100. This allows the first port to extend from the first module 100 and to pass through the divider and connect to the second port on the second module 200. The divider may be made of a material that the field created by the first port is not attracted to for example if field is a magnetic field then the divider may be made of a non magnetic material so that the first port is not attracted to the divider while the first module is inserted into the chassis 600.

In one embodiment the first ring will apply force to the first port if the first module 100 is adjacent to the second module 200 and either the first module 100 or the second module 200 are removed from the chassis 600 in the X direction. The first port and the second port will separate before contacting the divider 695. The flexible member connected to the first port can pull the first port back away from the divider so that the first port does not make contact with the divider 695.

Figure 7:
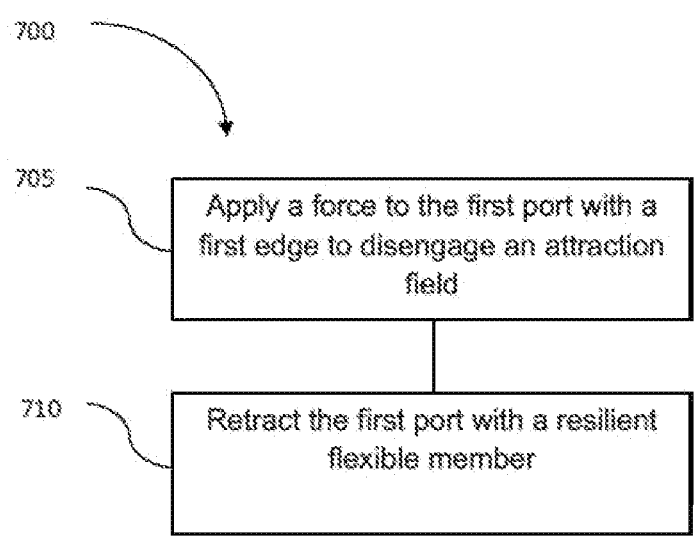
FIG. 7 is a flow chart of a method of creating a data bus according to an example embodiment of the invention.

FIG. 7 is a flow chart of a method of creating a data bus according to an example embodiment of the invention. The example method 700 of disconnecting a communications port includes applying a force to the first port with a first edge to disengage an attraction field holding a first port to a second port if the first port is connected to a second port and if a first module is not aligned with a second module at 705. The force applied to the first port can be due to the first housing of the first module becoming not aligned with a second housing of the second module. The after applying the force to the first port. The first port can be retracted away from the second port with a resilient flexible member connected to the first port at 710. The resilient flexible member can include a resting state that positions the first port if there are no fields acting on the first port. The resting state of the flexible member can be a retracted state of the first port. If a field acts on the first port to attract it to another port the flexible member may be pulled out of its resting state until the field is no longer acting on the first port.

After the first port is retracted the first port can extend and connect to a second port by aligning the first module with the second module. Aligning the first module with the second module can cause the first port to be attracted to the second port in the second module causing the first port to extend and connect to the second port.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing system comprising:
    a first module including a first housing;
    an opening in a first side of the first housing;
    a first port including an attraction field to attract a second port if the second port was within the attraction field;
    a flexible member supporting the first port in the opening; and
    a first edge around the opening to apply a force to overcome the attraction force.

2. The system of claim 1, further comprising a second module including the second port.

3. The system of claim 2, further comprising a second flexible member between a second housing of the second module and the second port.

4. The system of claim 2, further comprising chassis containing both the first module and the second module.

5. The system of claim 3, wherein if the first module and the second module are in a chassis the first module can transmit data to the second module through the first port and the second port.

6. The system of claim 1, wherein the first edge is not attracted to the first port by the attraction field.

7. The system of claim 1, wherein the first port includes an optical bus.

8. The system of claim 1, further comprising a beveled edge on the first port to guide the first edge.

9. The system of claim 1, wherein the attraction field is a magnetic field.

10. The computing system of claim 1, wherein the first edge comprises a beveled surface to apply the force to overcome the attraction force.

11. A method of disconnecting a communications port, comprising:
    applying a force to a first port with a first edge to disengage an attraction field holding the first port to a second port if the first port is connected to a second port and if a first module is not aligned with a second module; and retracting the first port away from the second port with a resilient flexible member connected to the first port.

12. The method of claim 11, wherein the force is applied to the first port if the first housing of the first module becomes not aligned with a second housing of the second module.

13. The method of claim 12, further comprising aligning the first module with the second module.

14. The method of claim 13, wherein the first port is attracted to the second port in the second module.

15. The method of claim 11, wherein applying the force to the first port with the first edge to disengage the attraction field comprises using a beveled surface of the first edge to generate at least part of the applied force.

16. A computing system comprising:
a first module with a first port;
a second module with a second port;
a chassis including the first module and the second module; and
a first ring on at least one of the first and the second modules to apply a force to at least one of the first port and the second port to break an attraction force between the first port and the second port.

17. The system of claim 16, wherein the first module and the second module are adjacent.

18. The computing system of claim 16, wherein the first ring comprises a beveled surface to apply the force to break the attraction force between the first port and the second port.

* * * * *